United States Patent [19]

Mudde

[11] 3,879,493

[45] Apr. 22, 1975

[54] VAPOR PERMEABLE COMPOSITIONS

[75] Inventor: John P. Mudde, Oak Lawn, Ill.

[73] Assignee: CPC International Inc., Englewood Cliffs, N.J.

[22] Filed: Oct. 26, 1973

[21] Appl. No.: 410,121

Related U.S. Application Data

[60] Division of Ser. No. 359,284, May 11, 1973, Pat. No. 3,792,009, which is a continuation-in-part of Ser. No. 266,038, June 26, 1972, abandoned, which is a continuation-in-part of Ser. No. 244,251, April 14, 1972, abandoned, which is a continuation-in-part of Ser. No. 226,202, Feb. 14, 1972, which is a continuation-in-part of Ser. No. 122,148, March 8, 1971, abandoned.

[52] U.S. Cl....... 260/859 R; 117/135.5; 260/2.5 A; 260/2.5 AY; 260/2.5 AD; 260/2.5 P; 260/30.6 R; 260/31.8 R; 260/31.8 N; 260/31.8 M; 260/31.8 G; 260/117; 260/876 R; 260/883; 260/899

[51] Int. Cl............................................. C08g 41/04

[58] Field of Search ............ 260/859, 883, 899, 117

[56] References Cited
UNITED STATES PATENTS

| | | | |
|---|---|---|---|
| 2,831,826 | 4/1958 | Coover | 260/899 |
| 3,026,289 | 3/1962 | Coover | 260/883 |
| 3,773,857 | 11/1973 | Kondo | 260/859 |

FOREIGN PATENTS OR APPLICATIONS

| | | |
|---|---|---|
| 752,485 | 2/1967 | Canada |
| 1,937,362 | 6/1969 | Germany |
| 1,953,348 | 10/1969 | Germany |

Primary Examiner—Paul Lieberman
Attorney, Agent, or Firm—Albert P. Halluin

[57] ABSTRACT

This application discloses a water vapor permeable polymeric composition comprising a substantially homogeneous blend of:

a. a normally hydrophilic linear thermoplastic polymeric material comprising from about 25 to about 40 parts by weight of a homopolymer, copolymer or graft copolymer of an unsaturated amide of the formula:

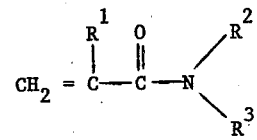

wherein $R^1$ is selected from the group consisting of hydrogen and alkyl of up to 4 carbon atoms; $R^2$ and $R^3$ are alkyl of up to 4 carbon atoms; and b. a normally hydrophobic polymeric material comprising from about 75 to about 60 parts by weight of a polyurethane, the combined weights of said normally hydrophilic and hydrophobic polymeric materials being 100 parts by weight, said polymeric composition being capable of producing continuous films and foams having improved water vapor transmission properties.

13 Claims, No Drawings

VAPOR PERMEABLE COMPOSITIONS

CROSS-REFERENCE TO RELATED APPLICATIONS

This application is a divisional patent application of U.S. application Ser. No. 359,284, filed May 11, 1973, now U.S. Pat. No. 3,792,009. U.S. patent application Ser. No. 359,284 is a continuation-in-part patent application of U.S. application Ser. No. 266,038, filed June 26, 1972, now abandoned, which is a continuation-in-part of U.S. patent application Ser. No. 244,251, filed Apr. 14, 1972, now abandoned, which in turn is a continuation-in-part of co-pending U.S. patent application Ser. No. 226,202, filed Feb. 14, 1972, which in turn is a continuation-in-part of U.S. patent application Ser. No. 122,148, filed Mar. 8, 1971, the latter application now abandoned.

BACKGROUND OF THE INVENTION a. Statement Of The Invention

This invention relates to new polymeric compositions having water vapor permeable and absorbance properties. More particularly, this invention concerns water vapor permeable compositions having good physical properties which render them useful for preparing a variety of coatings, films, and sheet materials.

b. Description Of The Prior Art

A great number of synthetic vapor permeable materials have been prepared in the last ten years in an effort to simulate leather and to increase the comfort in wearing apparel which has been prepared from synthetic polymeric materials. During the early development of synthetic vapor permeable materials, such products were prepared by applying polymeric coatings to porous substrates, followed by piercing the coatings with an embossing roll. This procedure leaves visible holes in the coating which greatly detracts from the appearance of products made to simulate leather.

Further work resulted in the preparation of porous structures by incorporating blowing agents and air into the compositions. Inclusion of volatile liquids in the compositions has also been used. Compositions containing soluble particles such as salt, ureas, starches, and sugar, were leached with chemicals capable of dissolving or degrading the particles to result in a permeable porous matrix. A refinement of this technique resulted in the use of soluble fibers which, when leached out of the composition, produce a network of fiber-sized holes. Another variation provided for the inclusion in the coating composition of fine, fragile, hollow spheres which are subsequently crushed by working the composition, leaving a permeable network.

Various additional methods for producing vapor permeable coatings have been devised. For example, polymer solutions such as cellulose nitrate, cellulose acetate, urethane, or nylon have been slowly precipitated in the presence of non-solvent liquids or vapors to form micro-porous structures. Poly(vinyl alcohol) can be gelled with formaldehyde to yield a fine-pored sponge. Dry powders of hard polymers such as poly(vinyl chloride) can be sintered to provide structures of a variety of pore sizes.

It is apparent that all of the above-described methods of producing vapor permeable films or coatings rely on the presence of actual open passageways to carry the moisture through the permeable substance. Alternative means have been employed to impart vapor permeability to polymer coatings, whereby moisture-absorbing chemical groups are incorporated into various polymer backbones. Further, moisture-sensitive polymers have been dispersed in a matrix of hydrophobic polymer to provide compositions wherein the water vapor transmission takes place by diffusion through the hydrophilic moieties. While most of these coatings exhibit water vapor permeation, they tend to lose some of the physical properties upon extended exposure to water. In many instances, these films become swollen, sticky and lose their tensile strength.

Various polymeric compositions containing polymers of acrylamides have been disclosed in the patent literature. For example, U.S. Pat. No. 2,831,826 to Coover, Jr., et al., (assigned to Eastman Kodak Company) discloses a blend comprising 70% to 95% by weight of a polymer of vinyl chloride with 30–5% by weight of a polymer of an acrylamide. U.S. Pat. No. 2,996,475 discloses blending 69–96% by weight of a polyester with 31–4% by weight of a polymer of an acrylamide, and U.S. Pat. No. 3,439,066, British Pat. Nos. 968,389 and 968,692 each discloses blending polypropylene with polymers of acrylamides. In each of the aforementioned prior art references, the amount of the polymer of the acrylamide does not exceed about 31% by weight. The disclosed blends are alleged as being useful in preparing various fiber materials. The references are not concerned with the preparation of "breathable" films or coatings.

Recently there has been disclosed polymeric compositions which are both water vapor permeable and water impermeable. These compositions will often contain a hydrophilic polymer such as a polymer of an acrylamide. These prior art compositions generally require a cross-linking agent to prevent the hydrophilic polymer from leaching out when subjected to excessive moisture. For example, it is disclosed in U.S. Pat. No. 3,265,529 to Caldwell, et al., (assigned to Eastman Kodak Company) that a breathable fabric material can be prepared by coating the same with an elastomeric composition comprising 60% butadiene and 40% N,N-dimethylacrylamide in the presence of a curing agent and accelerator (Example 3).

SUMMARY OF THE INVENTION

It has now been found that water vapor permeable and absorbant films, coatings, and sheet materials can be readily prepared which have good physical properties upon extended exposure to water. Contrary to the blends in which the moisture-absorbing polymers are merely dispersed within the hydrophobic matrix, in the present compositions the hydrophilic materials fuse with the hydrophobic material to form a homogeneous blend which results in completely clear films when milled. These milled films are capable of being embossed and finished to provide leather-like products. Since all materials in the blends are thermoplastic and remain so, they can be formed into very thin, clear, smooth films, which will swell uniformly when exposed to moisture, but will regain their original shape and properties after subsequent drying. In most of the previously mentioned blends, only the hydrophobic phase swells, resulting in a rough surface and loss of strength.

The present invention is concerned with a water vapor permeable polymeric composition comprising a substantially homogeneous blend of:

a. a normally hydrophilic linear thermoplastic polymeric material comprising from about 40 to about 60 parts by weight of a homopolymer, copolymer or graft copolymer of an unsaturated amide of the formula:

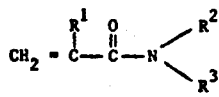

wherein $R^1$ is selected from the group consisting of hydrogen and alkyl of up to 4 carbon atoms, $R^2$ and $R^3$ are alkyl of up to 4 carbon atoms; and b. a normally hydrophobic polymer comprising from about 60 to about 40 parts by weight of a plasticized polymer of vinyl chloride, the combined weights of said normally hydrophilic and hydrophobic polymeric materials being 100 parts by weight, said polymeric compositions being capable of producing continuous films and foams having improved water vapor transmission properties.

DESCRIPTION OF THE PREFERRED EMBODIMENTS

A preferred embodiment of the present invention is concerned with a water vapor permeable polymeric composition comprising a substantially homogeneous blend of:

a. a normally hydrophilic linear thermoplastic polymeric material comprising from about 40 to about 60 parts by weight of a copolymer of at least about 75% by weight of an unsaturated amide of the formula:

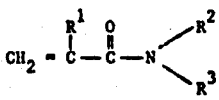

wherein $R^1$ is selected from the group consisting of hydrogen and alkyl of up to 4 carbon atoms, $R^2$ and $R^3$ are alkyl of up to 4 carbon atoms, and not more than 25% by weight of a polymerizable monomer containing a

moiety;

b. a normally hydrophobic polymer comprising from about 60 to about 40 parts by weight of a plasticized polymer of vinyl chloride, the combined weights of said normally hydrophilic and hydrophobic polymeric materials being 100 parts by weight; and c. an adduct or ester of at least one polyalkylene oxide which is either i. copolymerized with said unsaturated amide, or ii. present as a plasticizer for said polymer of vinyl chloride in an amount to effect plasticization of said polymer of vinyl chloride, said polymeric composition being capable of producing a continuous film having improved water vapor transmission properties.

The term "linear" is used herein to designate both straight chained, branched and graft polymers but to the exclusion of thermoset materials.

The Normally Hydrophilic Linear Thermoplastic Polymeric Materials

The normally hydrophilic linear thermoplastic polymeric materials derived from the above-described unsaturated amides are known in the art. The unsaturated amides particularly useful in preparing the hydrophilic thermoplastic polymeric materials include:

N,N-dimethylacrylamide (NNDMA),
N-ethyl-N-methyl-acrylamide,
N,N-dipropylacrylamide,
N,N-diisopropylacrylamide,
N-methyl-N-propyl-acrylamide,
N,N-dibutylacrylamide,
N,N-dimethylmethacrylamide,
N,N-dibutylmethacrylamide, and the like, and their derivatives. N,N-dimethylacrylamide is particularly preferred as the unsaturated amide useful in preparing the hydrophilic thermoplastic polymeric materials.

The normally hydrophilic linear thermoplastic polymeric material cannot be derived from an unsaturated amide containing labile hydrogen atoms on the nitrogen atom for the reason that hydrogen bonding will occur in the final polyblend and a homogeneous polymer will not result when employing the high levels of the hydrophilic polymers required in the practice of the present invention. Therefore, the unsuitable polymers include those derived from acrylamide, methacrylamide, N-methylacrylamide, N-isopropylacrylamide, N-tert.butylacrylamide, etc.

The alpha-beta-unsaturated amides useful in the preparation of hydrophilic polymeric materials of the invention are produced by many known syntheses, such as by the pyrolysis of the reaction product of beta-propiolactone and a dialkylamine as described in U.S. Pat. No. 2,548,155. The preferred processes for preparing the unsaturated amides are disclosed in co-pending patent applications Ser. No. 285,796, filed Sept. 1, 1972, entitled "Preparation of N,N-Dialkylamides of Alpha, Beta-Olefinically Unsaturated Monocarboxylic Acids" to Daniher, et al., and Ser. No. 308,213, filed Nov. 20, 1972, entitled "Preparation Of Amides" to Daniher, et al., the disclosures of which are incorporated herein by reference.

The homopolymers and copolymers of the above-described unsaturated amides may be prepared in various systems by charging the monomers and a free-radical catalyst such as benzoyl peroxide to a polymerization bottle or flask containing hexane, heptane, or a similar liquid transfer medium and equipped for temperature control, agitation and condensation of reaction vapors. Several hours of heating and stirring at 50° to 70°C produces a polymer or copolymer that can be filtered, washed and vaccum dried at 40° – 50°C.

The comonomers suitable for preparing the copolymers of the alpha-beta-unsaturated amides include those polymerizable monomers containing a

moiety, wherein the polymer of said polymerizable co-monomer has a glass transition temperature below that of the homopolymer of the alpha-beta-unsaturated amide. Exemplary monomers include butyl acrylate, 2-ethylhexyl acrylate, acrylonitrile, vinyl acetate, polymerizable esters of polyalkylene oxides, including, but not limited to, acrylic, methacrylic and maleate half esters of polyethylene or polypropylene oxides. Illustrative of the latter mentioned esters are those described in U.S. Pat. No. 3,277,157 to Stewart, et al., and the interpolymers of said esters with acrylamides as described in U.S. Pat. No. 2,839,430 to Rimmer, the disclosures of which are incorporated herein by reference.

Graft copolymers of alpha-beta-unsaturated amides suitable as hydrophilic thermoplastic polymeric materials can be prepared by methods known in the art. One preferred method includes grafting the alpha-beta-unsaturated amide onto a backbone polymer having the proper glass transition temperature, as alluded to hereinabove. For example, N,N-dimethylacrylamide can be grafted onto the backbone of polybutyl acrylate using benzoyl peroxide as the polymerization initiator. Alternatively, the above-mentioned polymerizable monomers, particularly the polymerizable esters of polyalkylene oxides, can be grafted onto the backbone of the alpha-beta-unsaturated amides, e.g., poly(N,N-dimethylacrylamide).

As previously stated, the copolymers or graft copolymers which comprise the hydrophilic thermoplastic polymeric materials are employed in such proportions that at least 75% by weight of the unsaturated amide is present in the copolymer or graft copolymer. Preferably, the copolymer or graft copolymer will contain at least about 85% by weight of the unsaturated amide, more preferably at least about 90% by weight of the unsaturated amide. A particularly preferred copolymer comprises a copolymer of about 90% by weight of N,N-dimethylacrylamide copolymerized with about 10% by weight of either butyl acrylate or 2-ethylhexyl acrylate, butyl acrylate being particularly preferred.

The Normally Hydrophobic Polymeric Materials

The hydrophobic polymeric materials of the polyblends of the present invention are well-known and readily available. Examples of suitable hydrophobic polymeric materials include the plasticized polymers of vinyl chloride.

The plasticized polymers of vinyl chloride include poly(vinyl chloride), copolymers of vinyl chloride with vinyl acetate, vinylidene chloride or acrylonitrile, as well as plasticized polymers and copolymers of vinyl chloride containing at least about 85% by weight of poly(vinyl chloride).

As described in detail hereinafter the preferred method for preparing the breathable films of the invention includes dry blending the plasticized normally hydrophobic polymer of vinyl chloride with the hydrophilic polymer. For this purpose, it is preferred to employ a polymer of vinyl chloride which has a particle size and characteristic such that it will homogeneously absorb the plasticizer or plasticizer compositions employed. If sufficient plasticization of the polymer of vinyl chloride is not accomplished, gels or "fisheyes" will occur in the final film. These "fisheyes" are particularly noticeable in the form of localized blemishes in pigmented film or sheeting. Therefore, it is preferred to employ those polymers of vinyl chloride which are capable of absorbing large quantities of plasticizer.

Polymers of vinyl chloride which are capable of absorbing large amounts of plasticizers and, accordingly, exhibit a lower propensity to form "fisheyes" when extruded are well-known, commercially available materials. Such materials include Vygen (particularly Vygen 110, a product of General Tire and Rubber Company) and Escambia "Pearl" PVC, types 2185, 2200, 2225 and 2250, representing very low, low, medium and high molecular weights, respectively.

Additives To The Polymeric Materials

In addition to the essential ingredients which consist of the polymers heretofore described, it is preferred in many instances to incoporate additional ingredients into the water vapor permeable compositions of this invention. For example, when employing polymers of vinyl chloride as the hydrophobic polymeric material, it is essential that at least one plasticizer be employed for such polymeric materials. A plasticizer for one or both of the polymeric materials in an amount of from about 5 to about 100 parts by weight per 100 parts of combined hydrophilic and hydrophobic polymeric material can be desirable in many instances. Preferably, one or more plasticizers are used in amounts of up to about 60 parts by weight per 100 parts by weight of combined hydrophilic and hydrophobic polymeric material. The particular amount of plasticizer employed will depend on the hydrophobic polymer used, as well as the ratio of hydrophilic to hydrophobic polymeric material in the end use of the product. When the hydrophobic polymeric material is poly(vinyl chloride), for example, a plasticizer can be used to render the resulting composition flexible, as well as elastomeric.

Exemplary plasticizers which can be used to plasticize the polymer of vinyl chloride include dioctyl phthalate, tricresyl phosphate, trioctyl phosphate; adipate, azelate and sebacate esters; trioctyl malletate esters and polyesters, such as the paraplex products of Rohm and Haas, polyalkylene oxides, including polyethylene and polypropylene oxides known as the Carbowaxes (when used in conjunction with ester-containing plasticizers such as dioctyl phthalate), adducts or esters of polyalkylene oxides, such as the acrylate, methacrylate, maleate half esters of polyalkylene oxide ethers and the diesters of polyalkylene oxides such as the diaryl and dialkyl esters of propylene glycol, dipropylene glycol and mixtures thereof (e.g., the compound dipropylene glycol-dibenzoate, diethylene glycol-dibenzoate and mixtures thereof, sold under the name Benzoflex, a product manufactured and sold by Velsicol Corporation). Particularly advantageous results are obtainable by using more than one plasticizer, such as dioctyl phthalate, in combination with polyethylene oxide, an ester of a polyalkylene oxide, and the like. Especially desirable products are obtained by using a combination of dioctyl phthalate and dipropylene glycol-dibenzoate or dipropylene glycol-dibenzoate or mixtures thereof. Especially desirable results are obtained by employing 45-55 parts by weight of dioctyl phthalate in combination with 15-5 parts by weight of a Benzoflex plasticizer such as dipropylene glycol-dibenzoate per 100 parts by weight of combined hydrophilic and hydrophobic polymeric materials.

Other ingredients which can be incorporated into the vapor permeable compositions comprise coloring pigments, fillers, heat stabilizers, UV absorbers, and the like. The use of these additives is well understood in the art and needs no further elaboration herein.

As heretofore indicated, the water vapor permeable compositions of this invention contain from about 40 to about 60 parts by weight of the hydrophilic thermoplastic polymeric material and 60 to 40 parts by weight of the hydrophobic polymeric material, as has been described. In a preferred embodiment of the present invention, the composition comprises from about 45 to about 55 parts by weight of the hydrophilic thermoplastic polymeric material and from about 55 to about 45 parts by weight of the hydrophobic polymeric material. Best results are generally obtainable by using an equal weight mixture of the hydrophilic polymeric material and the hydrophobic polymer. Generally speaking, an increase in the proportion of the first polymer to that of the second will result in an increase in water vapor transmission and absorbance and a decrease in tensile strength of the films or sheets prepared therefrom. As a result, the respective proportions of the polymers can be varied to obtain a balance of properties in the final product.

The vapor permeable compositions of the present invention can be prepared by physically blending the individual components in various ways, such as solvent or emulsion blending followed by evaporation of the medium, or dry shear blending at elevated temperatures.

Solvent blending comprises dissolving the thermoplastic hydrophilic and hydrophobic polymeric materials in a mutual solvent, casting the solution onto a desired substrate and evaporating the solvent, leaving the vapor permeable composition as a film or coating on the substrate. This film can be left remaining on the substrate or can be stripped by a suitable means, as desired. This method of preparing the compositions of this invention is useful when thin films or coatings are required or when maximum penetration into a porous or woven substrate is desired.

In many instances, the hydrophobic polymeric material hereinabove described is available in the form of an emulsion. since the polymers prepared from the defined unsaturated amides are water soluble, aqueous solutions of these polymers can be readily dispersed in the emulsion of the second polymer to obtain homogeneous blends. The resulting mixtures can then be coated onto desired substrates followed by the evaporation of water to produce the vapor permeable composition. The blending of aqueous solutions of the first polymer with emulsions of the second polymer has the advantage of eliminating the safety hazard accompanying the use of volatile solvents.

The preferred method of preparing the water vapor permeable compositions of this invention comprises blending the polymers in the dry state and without the use of solvents. This can be effected by first mixing the required components in granular or powder form and thereafter subjecting the mixture to moderately high shear forces at a temperature near the softening point of the mixture. All of the additives desired in the final composition can also be initially added to the mixture. A variety of process equipment is available which can impart sufficient shear to result in intimate blending. Two roll mills, such as are used in the rubber industry, Sigma blenders, Banburry blenders, and screw extruders are examples of such equipment. The temperature at which the polymer mixture is worked will vary with the selection of the individual components, but will be near the softening point of the polymers used. Care must be exercised, however, not to approach the decomposition temperature of any of the components. Heat stabilizers for the polymer can be used when the decomposition of the polymers becomes a problem. In many instances, the use of a plasticizer will reduce the temperature at which a particular polymer blend can be worked on the equipment heretofore described.

The water vapor permeable and absorbable compositions of the present invention and their preparation are more specifically illustrated in the following examples.

EXAMPLE 1

Production Of Vapor Permeable Films From A Poly(Vinyl Chloride)-Poly(N,N-Dimethylacrylamide) Polyblend Several polyblends were prepared by blending varying amounts of powdered poly(vinyl chloride), powdered poly(N,N-dimethylacrylamide) and barium-cadmium stearate heat stabilizer. Each of the mixtures was blended in a paper cup until thoroughly mixed. Dioctyl phthalate was added to each of the polymer blends and the blends were stirred into a uniform mixture. The mixtures were then worked on a two-roll mill at a temperature of about 300°F until fused. After this time, the fused mixture was milled for an additional period of from about 5–10 minutes to insure a uniform plastic mass. This mass was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

The following table provides the relative amounts of materials added in the runs prepared according to the above procedure.

TABLE 1

| Run No. | Poly(NNDMA) (grams) | Poly(vinyl chloride) (grams) | Plasticizer (grams) | Barium-Cadmium Stearate (grams) |
|---|---|---|---|---|
| 1 | 50 | 50 | 60$^{(a)}$ | 3 |
| 2 | 40 | 60 | 60$^{(a)}$ | 3 |
| 3 | 33 | 67 | 60$^{(a)}$ | 3 |
| 4 | 25 | 75 | 60$^{(a)}$ | 3 |
| 5 | 14 | 86 | 60$^{(a)}$ | 3 |
| 6 | 40 | 60 | 60$^{(b)}$ | 3 |
| 7 | 40 | 60 | 100 | 3 |
| 8 | 60 | 40 | 60$^{(c)}$ | 3 |

$^{(a)}$Dioctyl phthalate plasticizer.
$^{(b)}$Polyester plasticizer (Paraplex G-33, a product of Rohm and Haas Company).
$^{(c)}$Tricresyl Phosphate plasticizer.

The properties of the water vapor permeable compositions of the present invention were determined by various standard testing techniques.

The ability of the compositions to absorb water both at room temperature as well as at the boiling temperature of water was determined by measuring the weight change of a sample after immersion for a given period of time. The test specimens were in the form of a bar 5 inches in length by ½ inch in width and 20 mils in thickness. After being weighed, the specimens were immersed in distilled water for a period of one hour and 18 hours at room temperature and for a period of one hour in boiling water. The test specimens were then wiped and immediately weighed to determine the water absorption capacity of the composition.

After the initial weighing, the specimens were dried at a temperature of 70°C for a period of 2 hours and were weighed again to determine amount of material which was leached out of the composition during the immersion period. The results of these experiments are shown in the following tables. Table 2 shows the weight change of the specimens representing the water absorption of the compositions of this invention after various immersion periods in both water at room temperature and at boiling temperature. Table 3 shows the weight change of dry samples after having undergone the water absorption test and represents loss of product due to leaching out of hydrophilic material from the compositions. The results in Tables 2 to 4 are expressed in percent by weight.

TABLE 2

Water Absorption Of Test Compositions

| Test Specimen | Immersion Period | | |
|---|---|---|---|
| | 1 Hour at R. T. | 18 Hours at R. T. | 1 Hour at 100°C |
| Product of Run 1 | 31 | 44 | 44 |
| Product of Run 2 | 19 | 21 | 19 |
| Product of Run 3 | 1.9 | 9 | 12 |
| Product of Run 4 | 1.1 | 6 | 10 |
| Product of Run 5 | 0.5 | 3 | 6 |
| Product of Run 6 | 15 | 23 | 33 |
| Product of Run 7 | 13 | 18 | 11 |

TABLE 3

Weight Change Of Dry Compositions After Absorption Test

| Test Specimen | Immersion Period | | |
|---|---|---|---|
| | 1 Hour at R. T. | 18 Hours at R. T. | 1 Hour at 100°C |
| Product of Run 1 | Not tested | −1.0 | −1.5 |
| Product of Run 2 | −0.7 | −0.7 | −0.6 |
| Product of Run 3 | −0.1 | −0.07 | −0.3 |
| Product of Run 4 | −0.1 | −0.13 | −0.2 |
| Product of Run 5 | 0.0 | −0.06 | +0.1 |
| Product of Run 6 | Not tested | −1.4 | −1.8 |
| Product of Run 7 | −0.2 | −0.3 | −0.15 |

The water absorption properties of the second polymers used in the compositions set forth in the examples were determined for control purposes. In these experiments, procedures identical to those described for the compositions in Table 2 were used. Furthermore, the identical second polymers are used in the compositions of the examples were utilized. The results of these tests are shown in Table 4.

TABLE 4

Water Absorption Of Control Samples

| Test Specimen | Immersion Period | | |
|---|---|---|---|
| | 1 Hour at R. T. | 18 Hours at R. T. | 1 Hour at 100°C |
| Poly(vinyl chloride)* | 0.04 | 0.1 | 1.5 |

*The sample contained 60 parts by weight dioctyl phthalate plasticizer per 100 parts by weight of poly(vinyl chloride).

The tensile strength in pounds per square inch of the various vapor permeable compositions of this invention was determined under various conditions hereinafter referred to as conditions A, B, C, or D. The tensile properties were measured in accordance with the procedures detailed by ASTM Method D638-64T. Condition A represents the state of the product after preparation in accordance with the examples herein set forth. Condition B represents the state of the product after immersion in boiling water for a period of one hour, followed by drying at a temperature of 70°C for a period of 2 hours. Condition C represents the state of the product after exposure to 85% relative humidity for a period of 18 hours at room temperature. Condition D represents the state of the product after immersion in water at room temperature for a period of 18 hours, followed by drying at 70°C for a period of 2 hours. The results of these tests expressed in pounds per square inch are shown in Table 5.

TABLE 5

| Test Specimen | Tensile Strength Condition | | | |
|---|---|---|---|---|
| | A | B | C | D |
| Product of Run 1 | 1250 | 1220 | Not Tested | 1300 |
| Product of Run 2 | 1800 | 1890 | 1250 | 1700 |
| Product of Run 3 | 2020 | 2040 | 1360 | 1680 |
| Product of Run 4 | 2000 | 2110 | 1270 | 1800 |
| Product of Run 5 | 2370 | 2300 | 2000 | 2040 |
| Product of Run 6 | 1070 | 1200 | Not Tested | 1050 |
| Product of Run 7 | 500 | 500 | 380 | 480 |

The effectiveness of the compositions of this invention as vapor permeable materials was demonstrated in experiments wherein the water vapor transmission of sheets having a thickness of 10 mils was measured. The procedure of ASTM Test Method E96-63T(B) was used in this experiment. This procedure comprises measuring the amount of water vapor in grams which will permeate a sample which is exposed to 100% relative humidity on one side and 50% relative humidity on its other side. The results of this procedure are expressed in grams of water transmitted in 24 hours per square meter of surface. The data is shown in Table 6.

TABLE 6

Water Vapor Transmission

| | g./24 hrs./m$^2$ |
|---|---|
| Product of Run 1 | 550 |
| Product of Run 2 | 380 |
| Product of Run 3 | 48 |
| Product of Run 4 | 28 |
| Product of Run 5 | 16 |
| Product of Run 6 | 280 |
| Product of Run 7 | 300 |

The water vapor transmission of poly(vinyl chloride) plasticized with dioctyl phthalate in a 100 to 60 parts by weight ratio was also determined for the purpose of a control and was found to be 9 g./24 hrs./m$^2$.

An analysis of the data in Tables 2–6, particularly the water vapor transmission data in Table 6, illustrate that the polyblends must have at least about 40 parts by weight of the poly(N,N-dimethylacrylamide) polymeric material to provide a satisfactory "breathable" film at a thickness of about 10–20 mils. Those blends (Run Nos. 3, 4, and 5) which contain less than 40 parts by weight of the hydrophilic polymeric material in the blend are markedly inferior.

Films prepared from polyblends of hydrophobic polymers, such as poly(vinyl chloride) and various modified polymers of unsaturated amides have been found to possess excellent physical properties, and in some instances, superior properties as compared to the polyblends utilizing homopolymers of the unsaturated amides are obtained with the modified polymers. For example, copolymers of the unsaturated amides with polymers having a lower glass transition temperature have been found to have a profound effect on the strength of the polyblend films. Other modified polymers of the unsaturated amides include graft copolymers of the unsaturated amides, such as the graft copolymer of N,N-dimethylacrylamide and butyl acrylate prepared by grafting the former onto a poly(butyl acrylate) backbone with a free-radical catalyst, e.g., benzoyl peroxide, or grafting a maleate half ester of polyethylene oxide (having a molecular weight of 600–1,500) to a backbone of N,N-dimethylacrylamide, e.g., reacting N,N-dimethylacrylamide with the maleate half ester in the presence of azobisisobutronitrile catalyst in a benzene solvent.

EXAMPLE 2

Production Of Vapor Permeable Film From A Poly(Vinyl Chloride)-Poly(N,N-Dimethylacrylamide)/Butyl Acrylate Copolymer Polyblend The copolymer of N,N-dimethylacrylamide/butyl acrylate was prepared in a non-aqueous heterogeneous polymerization system using heptane as the transfer medium and calcium stearate salt as a surfactant. The polymerization was initiated with azobisisobutronitrile to produce a copolymer in the form of a suspension or unstable emulsion of intermediate particle size between normal aqueous suspension and emulsion polymers. The copolymer was recovered by filtration and was analyzed to be composed of 90/10 poly(N,N-dimethylacrylamide)/poly(butyl acrylate) copolymer.

Several polyblends were prepared by the following procedure:

Varying amounts of poly(vinyl chloride) (Vygen 110, a product of General Tire and Rubber Company), powdered copolymer of N,N-dimethylacrylamide and butyl acrylate as prepared hereinabove and barium-cadmium stearate heat stabilizer were blended in a paper cup. Dioctyl phthalate was added to each of the polymer blends and stirred into a uniform mixture. The mixtures were then worked on a two-roll mill at a temperature of about 300°F until fused. After this time, the fused mixtures were milled for an additional period of from about 5–10 minutes to insure a uniform plastic mass. The mass of each blend was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

The following table provides the relative amounts of materials added in the runs prepared according to the above procedure.

TABLE 7

| Run No. | Poly(NNDMA) (grams) | PVC (grams) | Plasticizer DOP (grams) | Barium-Cadmium Stearate (grams) |
|---------|---------------------|-------------|-------------------------|---------------------------------|
| 1 | 55 | 45 | 60 | 3 |
| 2 | 50 | 50 | 60 | 3 |
| 3 | 45 | 55 | 60 | 3 |
| 4 | 40 | 60 | 60 | 3 |
| 5 | 35 | 65 | 60 | 3 |

The properties of the water vapor permeable compositions prepared in Example 2, Run Nos. 1–5, were determined by various standard testing techniques, as more specifically described above with respect to Example 1. The results of these tests are summarized below in Table 8.

TABLE 8

| Test Specimen | WVT[a] g/24 hrs/m² | % Water Absorption Of Test Composition | | |
|---|---|---|---|---|
| | | 18 Hours at 85% R.H.[b] | 18 Hours at R. T.[c] | 1 Hour at 100°C |
| Product of Run 1 | 450 | 8.8 | 39 | 43.5 |
| Product of Run 2 | 370 | 7.9 | 33 | 35.7 |
| Product of Run 3 | 270 | 7.4 | 27 | 23.8 |
| Product of Run 4 | 150 | 6.4 | 24 | 14.2 |
| Product of Run 5 | 50 | 5.3 | 14 | 13.2 |

[a]Water Vapor Transmission
[b]Relative Humidity
[c]Room Temperature

The data in Table 8 illustrate that the polyblends of poly(vinyl chloride) and the copolymer of N,N-dimethylacrylamide and butyl acrylate possess excellent water vapor transmission and water vapor absorption properties. It is also evident from the data set forth in Table 8 that these properties are enhanced by employing increasing amounts of the hydrophilic polymer. As stated otherwise, water vapor permeability of these films is reduced by decreasing the relative amount of acrylamide polymer in the composition.

It is known that in order to provide a good "breathable" film, the film having a film thickness of 10–20 mils, must have a water vapor transmission of at least about 150 g./24 hrs./m². An analysis of the data in Table 8 clearly reveals that the polyblend (Run No. 5) which has less than 40 parts by weight of the poly(N,N-dimethylacrylamide) does not possess the proper water vapor transmission properties to be a suitable "breathable" film.

It is believed that the polyblends which are comprised of at least 40 parts by weight per 100 parts of total polymer are comprised of a continuous matrix of poly(N,N-dimethylacrylamide) or copolymer thereof in a matrix of the plasticized poly(vinyl chloride). When the poly(N,N-dimethylacrylamide) is at a level lower than 40 parts by weight of the total polymer content (poly(N,N-dimethylacrylamide) and poly(vinyl chloride), the poly(N,N-dimethylacrylamide) merely occurs as spots in the poly(vinyl chloride) matrix. The result is a far inferior breathable film, compared to the polymeric films of the present invention.

The polyblends prepared in Run Nos. 1–5 were clear thermoplastics having an unexpectedly improved compatibility with poly(vinyl chloride), as compared with the polyblends of homopolymer of N,N-dimethylacrylamide. The copolymer produces stronger films free from imperfections, such as "fish eyes." The loss of copolymer after prolonged immersion periods in water at room temperature or at 100°C does not exceed 1%, which points to the unusual stability of this polyblend.

It was also unexpectedly noted that the addition of the acrylamide polymers to plasticized poly(vinyl chloride) polyblends of the invention does not result in a reduction of abrasion resistance and the low temperature properties of poly(vinyl chloride) are not changed. It was discovered, also, that depending on the plasticizer used, no embrittlement is encountered to −20°F.

Similar beneficial water vapor permeable properties were obtained by blending the copolymer of N,N-dimethylacrylamide and butyl acrylate with other hydrophobic polymers such as polyurethane. Films of these polyblends also absorb and transpire moisture much like leather. Therefore, it can be seen from the above that the present invention is applicable to the use of hydrophobic polymeric materials which are flexible and leather-like. These polymers include polymers of vinyl chloride and polyurethane.

Copolymers of N,N-dimethylacrylamide with other monomers having a glass transition temperature (Tg) lower than poly(N,N-dimethylacrylamide) were also found to have similar water vapor permeable properties when blended with poly(vinyl chloride), e.g., 2-ethylhexyl acrylate, acrylonitrile, vinyl acetate, and polymerizable esters of polyalkylene oxides, were found to produce copolymers with N,N-dimethylacrylamide which formed stable polyblends with plasticized polymers of vinyl chloride.

As stated hereinabove, useful water vapor permeable films include those having a water vapor transmission of at least about 150 g./24 hrs./m$^2$ for a film having a thickness of about 10–20 mils, preferably more than 200 g./24 hrs./m$^2$. It is apparent from the data in Tables 6 and 8 that a useful water vapor permeable film is not obtained when the amount of the hydrophilic polymeric material falls below 40 parts by weight and the hydrophobic polymeric material correspondingly exceeds 60 parts by weight (based on a combined polymeric material having 100 parts by weight of hydrophilic and hydrophobic polymer materials). It can be seen from the data hereinabove that Run Nos. 3–5 of Example 1 describe polyblends containing 33, 25 and 14 parts by weight, respectively, of the hydrophilic polymeric material. The data in Table 6 clearly reveal that these products are far inferior as water vapor permeable films compared to the compositions of Example 1, Run Nos. 1, 2, 6, and 7, and Example 2, Run Nos. 1–4, which contain 40–60 parts by weight of the hydrophilic polymeric material. On the other hand, it can be seen from Example 1, Run Nos. 3, 4, and 5, and Example 2, Run No. 5, which contained less than 40 parts by weight of the hydrophilic polymeric material (poly(N,N-dimethylacrylamide) or copolymers thereof) that the water vapor permeability (WVT) is markedly inferior to the compositions containing 40–60 parts by weight of the hydrophilic polymeric material. Therefore, the compositions of the present invention clearly represent useful and commercially feasible vapor permeable compositions.

It has been discovered that the quality of the unsaturated polymer can have an adverse effect on the resulting milled film. For example, if the polymer of the unsaturated amide such as poly(N,N-dimethylacrylamide) contains hard particles, these particles often will not fuse with poly(vinyl chloride) and dioctyl phthalate during the milling process. The resulting films will thereby contain numerous small specks which become even more conspicuous after stretching of the film or after exposure to humid conditions. Additionally, when pigments are used to color the films, these particles will not absorb the pigments with the result of a spotted appearance in the film. The water vapor transmission of these films containing the infusible particles is also greatly reduced, as well as the tensile strength.

One means for obviating the foregoing problem is to increase the shear on the mill, e.g., by milling the material without the use of a plasticizer, followed by the addition of the plasticizer after the poly(vinyl chloride) and poly(N,N-dimethylacrylamide) mixture has been fused. This method, however, is sometimes not very practical and results in some degradation due to the severe conditions in the initial stage.

It has now been found that the presence of these particles can be completely eliminated and more uniform results can be obtained by the treatment of the polymer of the unsaturated amide such as poly-(N,N-dimethylacrylamide) with water. It appears as though the water softens the polymer and lowers the Tg sufficiently to enable it to blend smoothly with the hydrophobic polymer, poly(vinyl chloride), and the plasticizer, dioctyl phthalate, using normal, relatively mild conditions on the mill.

The following Examples illustrate the beneficial results obtainable by incorporating moisture in the polymer of the unsaturated amide.

EXAMPLE 3

Production Of A Vapor Permeable Film From A Poly(Vinyl Chloride)-Poly(N,N-Dimethylacrylamide) Polyblend Powdered poly(vinyl chloride) (90 grams; Vygen 110, a product of General Tire and Rubber Company), poly(N,N-dimethylacrylamide) containing hard chunks (60 grams) and barium-cadmium stearate heat stabilizer (3 grams) were blended in a paper cup. Dioctyl phthalate (90 grams) was added to the polymer blend and stirred into a uniform mixture. The mixture was then worked on a two-roll mill at a temperature of about 300°F until fused. After this time, the fused mixture was milled for an additional period of from about 5–10 minutes to insure a uniform plastic mass. This mass was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

EXAMPLE 4

Production Of A Vapor Permeable Film From A Poly(vinyl Chloride)-Poly(N,N-Dimethylacrylamide) Polyblend Powdered poly(vinyl chloride) (90 grams; Vygen 110, a product of General Tire and Rubber Company), poly(N,N-dimethylacrylamide) (60 grams) which had been mixed with 60 grams of water and left overnight at room temperature and barium-cadmium stearate heat stabilizer (3 grams) were blended in a paper cup. Dioctyl phthalate (90 grams) was added to the polymer blend and stirred into a uniform mixture. The mixture was then worked on a two-roll mill at a temperature of about 300°F until fused. After this time, the fused mixture was milled for an additional period of from about 5–10 minutes to insure a uniform plastic mass. This mass was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

It was noted that the water flashed off during the first few minutes of the milling process. Contrary to the films prepared in Example 3 which were slightly hazy and showed many specks upon stretching, the films prepared from the water soaked poly(N,N-dimethylacrylamide) were glossy and clear and remained so after elongation.

EXAMPLE 5

Production Of A Vapor Permeable Film From A Poly(Vinyl Chloride)-Poly(N,N-Dimethylacrylamide) Polyblend The procedure in Example 3 above was repeated, except that the poly(N,N-dimethylacrylamide) polymer was exposed to ambient conditions of relative humidity for six days. During this time, the water content of the polymer increased from an initial 1.3% to 5.0% as determined by the Karl Fischer method.

EXAMPLE 6

Production Of A Vapor Permeable Film From A Poly(Vinyl Chloride)-Poly(N,N-Dimethylacrylamide) Polyblend The procedure of Example 3 was repeated again, except that the poly(N,N-dimethylacrylamide) utilized had been exposed to 85% relative humidity for six days. The polymer had gained in water content from an initial 1.3% to 12.2% as determined by the Karl Fischer method.

The films prepared from the polyblends described in Examples 3–6 were tested in the manner described above. The results of the tests are set forth hereinbelow.

TABLE 9

Water Absorption Of Test Composition

| Test Specimen | Immersion Period | | |
|---|---|---|---|
| | 1 Hour at R.T. | 18 Hours at R.T. | 1 Hour at 100°C |
| Product of Example 3 | 3.9 | 13.4 | 14.6 |
| Product of Example 4 | 15 | 23 | 16.1 |
| Product of Example 5 | 13.3 | 21.7 | 13.7 |
| Product of Example 6 | 15.1 | 22.1 | 13.1 |

TABLE 10

Weight Change Of Dry Compositions After Absorption Test

| Test Specimen | Immersion Period | | |
|---|---|---|---|
| | 1 Hour at R.T. | 18 Hours at R.T. | 1 Hour at 100°C |
| Product of Example 3 | −0.6 | −1.2 | −0.1 |
| Product of Example 4 | −0.7 | −0.3 | −0.6 |
| Product of Example 5 | −1.5 | −1.2 | −1.3 |
| Product of Example 6 | −1.4 | −1.5 | −1.2 |

The tensile strength in pounds per square inch of the various vapor permeable compositions prepared in Examples 3–6 was determined under various conditions hereinafter referred to as Condition A, B, C, or D. The tensile properties were measured in accordance with the procedures detailed by ASTM method D638-64T. Condition A represents the state of the product after preparation in accordance with the Examples 3–6, as herein set forth. Condition B represents the state of the product after immersion in boiling water for a period of one hour, followed by drying at a temperature of 70°C for a period of two hours. Condition C represents the state of the product after exposure to 85% relative humidity for a period of 18 hours at room temperature. Condition D represents the state of the product after immersion in water at room temperature for a period of 18 hours, followed by drying at 70°C for a period of two hours. The results of these tests expressed in pounds per square inch are shown in Table 11.

TABLE 11

Tensile Strength

| Test Specimen | Condition | | | |
|---|---|---|---|---|
| | A | B | C | D |
| Product of Example 3 | 1500 | 1270 | 1100 | 1540 |
| Product of Example 4 | 2180 | 2390 | 1340 | 2620 |
| Product of Example 5 | 2160 | 1920 | 1200 | 2620 |
| Product of Example 6 | 1790 | 2180 | 1320 | 2090 |

The effectiveness of the compositions prepared in Examples 3–6 as vapor permeable materials was compared in experiments wherein the water vapor transmission of sheets having a thickness of 10 mils and measured. The procedure of ASTM test method E96-63T (B) was used in this experiment. This procedure comprises measuring the amount of water vapor in grams which will permeate a sample which is exposed to 100% relative humidity on one side and 50% relative humidity on its other side. The results of this procedure are expressed in grams of water transmitted in 24 hours per square meter of surface. The data is shown in Table 12.

TABLE 12

Water Vapor Transmission

| Test Specimen | g./24 hrs./m² |
|---|---|
| Product of Example 3 | 64 |
| Product of Example 4 | 280 |
| Product of Example 5 | 175 |
| Product of Example 6 | 240 |

It is apparent from the data set forth in the tables above, particularly the data in Table 12 which compares the water vapor transmission of the films, moisture content in the N,N-dimethylacrylamide polymer plays a significant role. Thus, it can be concluded that polyblends prepared from blending N,N-dimethylacrylamide having more than 3% moisture produce improved results, particularly when using polymers having hard chunks which are difficult to mill in the blending process.

Solvents other than water or humectants which soften the unsaturated amide polymer such as N,N-dimethylacrylamide exhibit similar results. Exemplary solvents include methanol, glycol, glycerol, and urea.

The following Examples illustrate the preparation of vapor permeable films from a polyblend of a hydrophobic polymer and a polymer of an unsaturated amide by first dissolving the respective polymers in mutual solvent and casting the homogeneous solution as a film.

EXAMPLE 7

Production Of a Vapor Permeable Film From A Poly(Vinyl Chloride)-Poly(N,N-Dimethylacrylamide) Polyblend A composition of 100 parts by weight poly(vinyl chloride) and 50 parts by weight poly(N,N-dimethylacrylamide) and 50 parts by weight dioctyl phthalate were cast as a film from tetrahydrofuran solution. The resulting film was clear. After dipping the clear film into water for short periods of about 10 minutes, a very opaque, white film was obtained after the film dried. The opacity was temporarily lost when the film was wetted with water, but the opacity returned when the film dried. Wherever heavy pressure was applied to the opaque film, such as with a fingernail or typewriter keys, that portion of the film became clear. Clear, legible printing by pen or typewriter was also obtained from the vapor permeable film.

EXAMPLE 8

Production Of A Vapor Permeable Film From A Poly(Vinyl Chloride)-Poly(N,N-Dimethylacrylamide) Polyblend A composition of 100 parts by weight poly(vinyl chloride) and 100 parts by weight poly(N,N-dimethylacrylamide) were cast as a film from a solution of tetrahydrofuran. The clear film became highly opaque when treated with water and had good strength and flexibility, as well as good ink receptivity. The water-treated film, as seen by optical microscope, appeared to show a reticulated structure. These voids scatter light to give the opacity in the film. The combination of voids and the poly(N,N-dimethylacrylamide) provided the film with both breathability and improved water vapor transport properties.

The films prepared in Examples 7 and 8 are also useful in preparing synthetic paper or pigmentless paper coatings having excellent pick, wet rub, and good varnish holdout. If desired, the films produced in this manner can be water-proofed with a barrier coat applied from hydrocarbon solvents such as toluene.

If desired, solvents other than tetrahydrofuran may be employed in the solvent film-forming procedure described in Examples 7 and 8. Those solvents selected will be obvious to those skilled in the art by reference to solubility tables, the only provision being that the solvent used will sufficiently dissolve both the hydrophobic polymer and the polymer of the unsaturated amide. Exemplary solvents in addition to tetrahydrofuran which will dissolve poly(vinyl chloride) and N,N-dimethylacrylamide polymers include methyl isobutyl ketone and dimethylformamide.

In addition to the leaching method for obtaining voids in films of the present invention, outstanding physical properties are obtained by including with the aforementioned solvent system a mutually miscible non-solvent for one of the polymers in the polyblend of the present invention, such as an aliphatic or aromatic hydrocarbon. Depending on the quantity of non-solvent employed, either a closed cell structure or an open cell structure can be obtained. For example, by employing about 50 parts by weight of a relatively low volatility non-solvent for one of the polymers in the blend whereby the solvent such as tetrahydrofuran evaporates at a much more rapid rate than a non-solvent, the non-solvent will precipitate in the form of minute droplets in the polymeric film structure and will thereafter evaporate from the film structure by diffusion, leaving behind a plurality of minute closed cells. Films prepared in this manner are highly opaque but are not porous. However, due to the internal void structure in the films, they have the inherent characteristics of being water vapor permeable. Therefore, the presence of both the hydrophilic polymer in the polyblend and the internal voids in the films complement each other to produce extremely useful films. For a more complete description of this technique, reference is made to U.S. Pat. Nos. 3,654,193, 3,655,591 and 3,661,807 to Jerome A. Seiner, the disclosures of which are incorporated herein by reference.

An open cell structure film can be readily obtained by the use of a non-solvent wherein the non-solvent is employed in copious amounts. In such instances, during film formation the presence of the large amount of non-solvent causes precipitation of the polymers with the subsequent evaporation of the non-solvent from the precipitated matrix, leaving behind open cell voids. Various modifications of this procedure are well-known in the art. However, the use of this system with a combination of hydrophilic and hydrophobic polymers which are compatible with one another has not been described, particularly the outstanding properties resulting therefrom.

Also contemplated within the scope of the present invention is the preparation of breathable vinyl films by a modified plastisol technique. Most of the poly(vinyl chloride) plasticizers do not plasticize poly(N,N-dimethylacrylamide). The known plastisol procedures cannot be used with the polyblends of the present invention.

As a matter of background, the plastisol technique for the preparation of flexible poly(vinyl chloride) films and coatings is well-known and used on a large scale industrially. The system consists of a special plastisol grade of poly(vinyl chloride), which is mixed with plasticizer at room temperature to a paste-like slurry and is converted to a film by casting on release paper and curing at 320°F for about 5 to 10 minutes without pressure. Organosols are plastisols to which a solvent is added to reduce the viscosity of the plastisol. They are used in a similar way as plastisols, the solvent being removed during the curing step. Since poly(N,N-dimethylacrylamide) is insoluble in dioctyl phthalate, or other common plasticizers, earlier attempts to make films by simply adding poly(N,N-dimethylacrylamide) to poly(vinyl chloride) plastisols were unsuccessful.

It has now been found that stable plastisol-type blends can be made of a desirable viscosity by dissolving the poly(N,N-dimethylacrylamide) in a solvent, prior to adding the material to the poly(vinyl chloride)/dioctyl phthalate plastisol. The requirements for the N,N-dimethylacrylamide polymer solvent are as follows: (1) it must be compatible with the poly(vinyl chloride)/dioctyl phthalate plastisol; (2) the solvent must be a non-solvent for poly(vinyl chloride) itself so as to prevent a large build-up of the viscosity; (3) the boiling point of the solvent must be within the range of 60°–150°C so that it can be easily removed during film formation without excess foaming. Exemplary solvents include alcohols, many of the aromatic compounds, ketones, etc. Normal butanol is the preferred solvent. The following examples illustrate this embodiment of the invention.

EXAMPLE 9

50 grams of poly(N,N-dimethylacrylamide) are dissolved in 150 grams of n-butanol by stirring at room temperature. This solution is added to a slurry containing 50 grams of poly(vinyl chloride) and 60 grams dioctyl phthalate and mixed by moderate agitation at room temperature. The resulting paste is stable for at least one week. Several films were prepared by casting the paste on glass plates utilizing a Gardner knife. After evaporation of the butanol at room temperature for 24 hours, the films were cured for 5 minutes at 150°C. The resulting films were slightly cloudy but smooth and homogeneous. The films exhibited a water vapor transmission as measured by ASTM method E96-Condition B of 700 g./24 hrs./m$^2$.

Using the same procedure as described above, a series of varying amounts of poly(N,N-dimethylacrylamide) (P-NNDMA) in poly(vinyl chloride) (PVC) were made as follows and the water vapor transmission of each of these films were measured (WVT). The results of these tests are shown in Table 13.

the prior art not only in the aspect of breathability in the resulting polymers, but also in that the added solvent is only a solvent for the hydrophilic polymer, i.e., poly(N,N-dimethylacrylamide) and not a solvent for poly(vinyl chloride), and the result obtains a homogeneous film, not to reduce the viscosity of the plastisol.

As alluded to hereinabove, it has also been found that the addition of a polyalkylene oxide having a molecular weight in the range of from about 600–1,500 improves the "hand" of the films prepared from a blend of N,N-dimethylacrylamide/butyl acrylate-poly(vinyl chloride). The improved hand of these novel blends containing the additional plasticizer are especially noticeable after exposure to extreme differences in relative humidity, where blends containing the polyethylene oxide polymer retain their soft, pliable texture, while blends without the polyethylene oxide polymer change from very soft at high humidity to stiff and boardy at low humidity. In addition, the water vapor transmission and water absorption are significantly improved also. The following examples illustrate the beneficial results obtainable by incorporating polyalkylene oxide as an additional plasticizer in the blends of the present invention.

EXAMPLE 10

Powdered poly(vinyl chloride) (55 grams; Vygen 110, a product of General Tire and Rubber Company), powdered copolymer of poly(N,N-dimethylacrylamide)/butyl acrylate as prepared in Example 2 above (45 grams; 90/10 copolymer of N,N-dimethylacrylamide/butyl acrylate having a glass transition temperature of 104°–105°C) and barium-cadmium stearate heat stabilizer (3 grams) were blended in a paper cup. Dioctyl phthalate (60 grams) was added to the polymer blend and stirred into a uniform mixture. Varying amounts of a polyethylene oxide having a molecular weight of 600–1,500 (Carbowax) was added to the above-described blend and stirred into a uniform mixture. The mixture was then worked on a two-roll mill at a temperature of about 300°F until fused. At this time, the fused mixture was milled for an additional period of from about 5 to 10 minutes to insure a uniform

TABLE 13

| Test Specimen | PVC | Poly(NNDMA) | Butanol | DOP | WVT |
|---|---|---|---|---|---|
| Trial No. 1 | 50 | 50 | 150 | 60 | 708 |
| Trial No. 2 | 60 | 40 | 120 | 60 | 536–573 |
| Trial No. 3 | 70 | 30 | 90 | 60 | 432–408 |
| Trial No. 4 | 80 | 20 | 60 | 60 | 252–297 |

It can be seen from the above table that the water vapor transmission decreases gradually with a decrease in poly(N,N-dimethylacrylamide). However, it is quite suprising that the water vapor transmission remains consistently at a much higher level than blends prepared at similar ratios by milling, as described hereinabove.

The advantages of using the aforementioned plastisol technique in general are well recognized and concern mainly ease of application and more defined and permanent imprints of surface details. The technique described above, which is one of the embodiments of the present invention, differs from the organosol system of plastic mass. This mass was then taken off the mill and was pressed at a temperature of about 300°F between two chromed steel plates separated by suitable spacing frames to provide sheets having a thickness of 10 and 20 mils. The sheets were then cooled to room temperature to yield the desired product.

The properties of the improved water vapor permeable compositions prepared by the method of Example 10 were determined as described in the previous examples. Table 14 illustrates the percent water absorption and the water vapor transmission of the novel polyblends containing varying amounts of the polyethylene oxide polymer (Carbowax 600 and Carbowax 1,500).

TABLE 14

| Parts By Wt. Carbowax 600 | WVT[a] g./24 hrs./m² | 1 Hour at 100°C | 18 Hours at 85% R.H.[b] | 18 Hours at R.T.[c] |
|---|---|---|---|---|
| 0 | 310 | 22 | 7.2 | 29 |
| 5 | 410 | 31 | 8.1 | 30 |
| 10 | 580 | 32 | 9.7 | 37 |
| 20 | 660 | 33 | 10.5 | 44 |

| Parts By Wt. Carbowax 1500 | | | | |
|---|---|---|---|---|
| 5 | 400 | 27 | 8.6 | 32 |
| 10 | 470 | 29 | 9.5 | 39 |
| 20 | 580 | 35 | 9.7 | 43 |

[a]Water Vapor Transmission, method of ASTM E96-B.
[b]Relative Humidity
[c]Room Temperature As it can be seen in Table 14, the water vapor transmission and percent water absorption is substantially increased by the addition of the polyethylene oxide plasticizer. For example, it is clear that the water vapor transmission of the polyblend more than doubles by the addition of 20 parts by weight of Carbowax 600, as compared to the sample having no Carbowax 600. In addition, the percent water absorption is also increased by the addition of the polyalkylene oxide plasticizer to the novel polyblend. The tensile strength and elongation of the blends containing the polyethylene oxide at levels of 5 or 10 parts by weight was not changed from those containing no polyethylene oxide. At a 20 parts by weight level, a drop in tensile strength was noted, this level exceeds the level of compatibility and therefore the usefulness of the polyethylene oxide decreases.

In addition to the polyethylene oxides as plasticizers for the N,N-dimethylacrylamide-poly(vinyl chloride) films, some polypropylene oxide based polyols also produce a marked improvement to the "hand" of covered fabrics when used as a co-plasticizer in the novel blends of this invention.

The following polypropylene oxide based polyols have been successfully prepared:
1. Cord 500 (a methyl glucoside based polypropylene glycol of approximately 450 molecular weight);
2. Cord 300 (same as above, with a 750 molecular weight);
3. Voranol RS 450 (a sucrose based polypropylene oxide polyol having a molecular weight of about 600); and
4. Voranol RQ 490 (a sorbitol based polypropylene oxide polyol having a molecular weight of about 700).

Each of the above polypropylene oxide based polyols was formulated with 55 parts by weight poly(vinyl chloride), 45 parts by weight of a copolymer of N,N-dimethylacrylamide and butyl acrylate, as prepared in Example 2, 60 parts by weight dioctyl phthalate plasticizer and 10 parts by weight in each of the test examples of the polypropylene oxide polyol listed above and 3 parts by weight of the barium-cadmium stearate stabilizer.

All of the films prepared in the above formulation produce very strong, clear sheets with a "hand" greatly improved over sheets without the polyols.

The addition of the polypropylene oxide based polyols did not change the water vapor transmission, contrary to the polyethylene oxide based polyols, which greatly improved the water vapor transmission.

Based upon the results of the comparative tests shown in Example 12 and Table 14, as well as the tests with respect to polypropylene oxide based polyols, it appears that the polyethylene oxide based products of fairly low molecular weight, i.e., under about 6,000, improve the "hand" in addition to the water vapor transmission of the novel blends of this invention. The polypropylene oxide based polyols of high functionality and low molecular weight also improve the "hand" but do not appear to improve the water vapor transmission of the films.

As it is disclosed hereinabove, the polyalkylene oxide polymers may also be used in the form of copolymers or graft copolymers with the alpha-beta-unsaturated amides to produce useful vapor permeable film compositions. The following examples illustrate this embodiment of the invention.

EXAMPLE 11

A copolymer of N,N-dimethylacrylamide and a maleate half ester of a 750 molecular weight polyethylene oxide capped with a methyl group was prepared in the following manner. The maleate half ester of the polyethylene oxide was prepared by condensing maleic anhydride with polyethylene oxide monomethylether, as shown by the following equation:

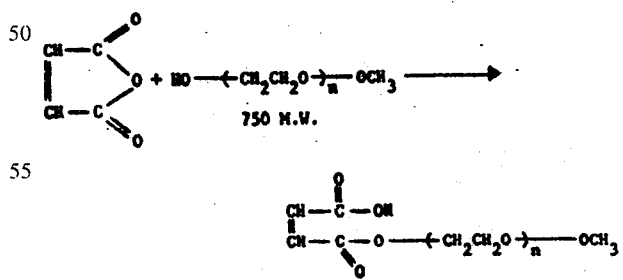

A reaction kettle was charged with 15 parts by weight N,N-dimethylacrylamide/butyl acrylate copolymer seed (NNDMA/BA, 90/10 copolymer), 0.75 parts by weight calcium stearate (1.5 parts by weight total including seed) and 250 parts by weight of heptane. The reactor was warmed to 70°C under a nitrogen purge, followed by the addition of a monomer mixture over a period of 4½ hours. The monomer mixture consisted of the following: 135 parts by weight of N,N-dimethylacrylamide, 15 parts by weight of the maleate half ester of the polyethylene oxide monomethylether as described above (Malox 750), 7.5 parts of an N,N-dimethylacrylamide/lauryl methacrylate copolymer (an NNDMA/LMA copolymer, 50/50 ratio), 0.3 parts by weight of azobisisobutyronitrile and 0.3 parts by weight of t-dodecyl mercaptan. After the seed was completed, the temperature was increased to 85°C for one hour. At this time, the agitator was stopped and the kettle cooled and opened. The polymer was recovered in the form of discrete, large particles which are useful in making the novel blends of the present invention, particularly blending of the same with poly(vinyl chloride).

EXAMPLE 12

55 grams of poly(vinyl chloride), 45 grams of the copolymer of poly(N,N-dimethylacrylamide)/maleate half ester of monomethylether of polyethylene oxide having a molecular weight of 750 and 3 grams of barium-cadmium stearate heat stabilizer were blended in a paper cup. 60 grams of dioctyl phthalate was added to the polymer blend and stirred into a uniform mixture. The mixture was then worked on a two-roll mill at a temperature of about 300°F until fused. After this time, the fused mixture was milled for an additional period from about 5 to 20 minutes to insure a uniform plastic mass. This mass was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

EXAMPLE 13

A copolymer of N,N-dimethylacrylamide with a monoethylether of polyethylene oxide having a molecular weight of about 750 is prepared as follows. A polymerization reaction kettle is charged with 90 parts by weight of N,N-dimethylacrylamide, 10 parts by weight of a monomethylether of polyethylene oxide having a molecular weight of 750 (Carbowax 750) and 40 parts by weight of benzene. To this reaction mixture there was added 0.5 parts by weight of azobisisobutyronitrile polymerization catalyst at a temperature of 70°C. The reaction was continued for 18 hours under a nitrogen purge. The product was recovered by precipitation in hexane and dried at reduced pressure. The resulting N,N-dimethylacrylamide/polyethylene oxide copolymer is a copolymer of the two polymers.

In order to evaluate the use of the above copolymer the novel blends of the present invention, the following mixture was prepared: 55 grams of powdered poly(vinyl chloride), 45 grams of the N,N-dimethylacrylamide copolymer as prepared above and 3 grams of barium-cadmium stearate heat stabilizer were blended in a paper cup. 60 grams of dioctyl phthalate was added to the polymer blend and stirred into a uniform mixture. The mixture was then worked on a two-roll mill at a temperature of about 300°F until fused. After this time, the fused mixture was milled for an additional period of from about 5 to 10 minutes to insure a uniform plastic mass. This mass was then taken off the mill and was pressed at a temperature of about 300°F between two chromed steel plates separated by suitable spacing frames to provide thin sheets having a thickness of 10 and 20 mils. The sheets were then cooled to room temperature to yield the desired product.

The properties of the water vapor permeable compositions prepared in Examples 12 and 13 were determined by various standard testing techniques, as more specifically described above with respect to Examples

TABLE 15

| Test Specimen | WVT[a] g./24 hrs./m² | % Water Absorption Of Test Composition | | |
|---|---|---|---|---|
| | | 1 Hour at 100°C | 18 Hours at 85% R.H.[b] | 18 Hours at R.T.[c] |
| Product of Example 12 | 330 | 27.0 | 7.2 | 33.6 |
| Product of Example 13 | 304 | 23.0 | 7.0 | 25.5 |

[a]Water Vapor Transmission, method of AST ME96-B.
[b]Relative Humidity
[c]Room Temperature The data in Table 15 illustrate that the polyblends of poly-(vinyl chloride) and the copolymer of N,N-dimethylacrylamide and the maleate half ester of the monomethylether of polyethylene oxide possess very satisfactory water vapor transmission and water vapor absorption properties. In addition, the products produced by the method of Examples 12 and 13 have very good "hand" and are tough films useful as a fabric coating.

As another preferred embodiment of the polyblends of the present invention, the monomethylethers of the polyethylene oxide polymers can be reacted with polymerizable compounds which are reactive with the free hydroxy group of the polyethylene oxide ether. These reaction products can then be used as plasticizers for the poly(N,N-dimethylacrylamide) homopolymers when blended with the poly(vinyl chloride) polymers. Examples of compounds which may be reacted with the monoalkylethers of polyalkylene oxides include polyisocyanates such as toluene diisocyanate. The isocyanate adducts modify the polyethylene oxide in a manner such as to introduce groups for possible hydrogen bonding so as to prevent the leaching out of the polyethylene oxide polymer from the polyblend film. Of course, other adducts to the polyalkylene oxide polymers may be used as it will be apparent to those skilled in the art.

EXAMPLE 14

Production Of A Vapor Permeable Film From A Poly(Vinyl

Chloride)-Poly(N,N-Dimethylacrylamide)/Butyl Acrylate Copolymer Polyblend

A polymer blend was prepared by uniformly mixing the following materials:

| Material | Amount, Parts By Wt. |
| --- | --- |
| Poly(vinyl chloride)[1] | 55 |
| N,N-dimethylacrylamide/ butyl acrylate 90/10 copolymer | 45 |
| Calcium carbonate[2] | 34 |
| TiO$_2$ | 5 |
| Acryloid KI20-N-D[3] | 3 |
| Barium-cadmium stearate | 2 |
| Tin mercaptide[4] | 0.5 |
| Dipropylene glycol- dibenzoate[5] | 10 |
| Dioctyl phthalate | 50 |

[1]Vygen 110, a product of General Tire and rubber Co.
[2]Puracol SC, a product of Wyandotte Chemicals.
[3]A processing aid produced by Rohm and Haas.
[4]Ferro 889 stabilizer.
[5]Benzoflex 9-88 plasticizer, a product of Velsicol Chemical Corporation.

The above mixture was worked on a two-roll mill at a temperature of about 290°F until fused. After this time, the fused mixture was milled for an additional period of from about 5-10 minutes to insure a uniform plastic mass. This mass was then taken off the mill and was pressed at a temperature of about 290°F between two chromed steel plates separated by a suitable spacing frame to provide thin sheets having a thickness of 10 to 12 mil. The sheets were then cooled to room temperature to yield the desired product. The product was tested for water vapor transmission and was found to have a water vapor transmission of 280 g./24 hrs./m$^2$. The polymeric blend was also measured for water absorption. The polymeric material, after one hour immersion in boiling water, had a 22% gain and no loss in weight. Another sample of the polymeric material immersed in water at room temperature illustrated a 24.3% gain and only a 0.2% weight loss. Still another sample was immersed in water for 18 hours at room temperature and demonstrated a 35% gain and only a 0.8% weight loss. A fourth sample was subjected to 85% relative humidity for 18 hours and demonstrated a 6.7% gain with no loss in weight. The polymeric films produced by the foregoing composition had an excellent "hand" which is believed to be accountable for the combination of using both the dioctyl phthalate and dipropylene glycol-dibenzoate plasticizer combination. Several other samples of the foregoing composition were calendared at 290°F to determine the speed at which the material could be processed. it was found that the foregoing composition could be calendared at 10-20 feet per minute with excellent results. The use of stearic acid on the rolls improved the processing. It can be seen from the above that the foregoing composition represents a marked advance over the prior art breathable films.

A further embodiment of the present invention resides in preparing a foamable composition from the polyblends of the present invention. These compositions are prepared by incorporating into the polyblend a blowing agent capable of decomposing to form a gas at a temperature near the softening point of the vapor permeable composition.

Blowing agents which leave no residue upon decomposition which is deleterious to the vapor permeable composition and which are not physiologically objectionable are preferred. The quantity of blowing agent employed can range up to about 10% by weight and, preferably, ranges from about 0.2% to about 8% by weight. Activators for the blowing agents can be utilized when desired.

Exemplary useful blowing agents are azodicarbonamide, N,N'-dimethyl-N,N-'-dinitrosoterphthalamide, 4,4'-oxy-bis(benzene sulfonyl hydrazide), dinitrosopentamethylene tetramine, and the like. Water vapor permeable films can also be prepared by frothing the composition with blowing agents such as air, nitrogen or hydrocarbon gases, as well as chloro and fluoro hydrocarbon gases such as the freons.

The vapor permeable compositions of the present invention can be used for a variety of purposes, such as for the manufacture of leather substitutes, upholstery fabrics, rain wear, and the like. It is desirable in many of these applications to provide foamed, flexible sheets which are resilient to the touch. The polyblends of the present invention which contain the hydrophilic polymer are also useful as being a dye receptive plastic. The films of the present invention are also useful in low static build-up coated fabrics and many specialty textile fibers.

It will be appreciated that many modifications of the present invention can be made without departing from the scope thereof. For example, it will be appreciated that the poly(N,N-dimethylacrylamide) can be blended in urethane rubbers or added to a polyester prepolymer prepared from polybutylene adipate prior to curing and applying the same to a textile backing. Additionally, the poly(N,N-dimethylacrylamide) can be blended in with such polymeric binders as the acrylics and polyacrylonitriles to produce breathable, non-woven textile films.

The present invention is also concerned with novel polymeric mixtures comprising:

a. a normally hydrophilic linear thermoplastic polymeric material comprising from about 25 to about 40 parts by weight of a homopolymer, copolymer or graft copolymer of an unsaturated amide of the formula:

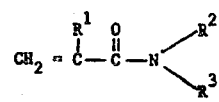

wherein R$^1$ is selected from the group consisting of hydrogen and alkyl of up to 4 carbon atoms; R$^2$ and R$^3$ are alkyl of up to 4 carbon atoms; and b. a normally hydrophobic polymeric material comprising from about 75 to about 60 parts by weight of a polyurethane, the combined weights of said normally hydrophilic and hydrophobic polymeric materials being 100 parts by weight.

A particularly preferred composition, as described above, comprises a mixture of:
a. a normally hydrophilic linear thermoplastic copolymer of:
  1. N,N-dimethylacrylamide, and
  2. a monomer capable of producing a polymer having a glass transition temperature less than poly(N,N-dimethylacrylamide), such as a polymer of butyl acrylate, 2-ethylhexyl acrylate, acrylonitrile and vinyl acetate, said normally hydrophilic copolymer being present in amounts ranging from about 25 to about 40 parts by weight; and
b. a normally hydrophobic polymer comprising a polyurethane, said normally hydrophobic polymer being present in amounts ranging from about 75 to about 60 parts by weight, the combined weights of said normally hydrophilic and hydrophobic polymeric materials being 100 parts by weight.

The foregoing polymeric materials are capable of producing continuous films having improved water vapor transmission properties, i.e., films of these polymers having a thickness of 10–20 mills have a water vapor transmission of more than 150 g./24 hrs./m$^2$, and more often greater than 250 g./24 hrs./m$^2$.

The normally hydrophilic polymer employed in the polyurethane compositions is comprised of the same type and character of polymers as described hereinabove with respect to the poly(vinyl chloride) type blends and, accordingly, the above disclosure concerning the normally hydrophilic thermoplastic polymers is incorporated herein by reference as to the polyurethane mixtures and/or blends.

The polyurethane polymer which can be used in the water vapor permeable composition can vary greatly and can include both the reaction products of isocyanates with polyethers, as well as polyesters. Exemplary isocyanates useful for preparing the polyurethane polymers which can be used in the vapor permeable compositions of the present invention include tolylene diisocyanate, 4,4'-diphenylmethane diisocyanate, tolidine diisocyanate, hexamethylene diisocyanate, m-xylylene diisocyanate, and the like.

Exemplary polyethers for preparing the polyurethane polymers include poly(oxypropylene) glycols, poly(oxypropylene) adducts of glycerol, poly(oxypropylene) adducts of trimethylol propane, poly(oxypropylene) adducts of 1,2,6-hexane triol, poly(oxypropylene) adducts of pentacrylthritol, poly(oxypropylene) adducts of sorbitol, poly(tetrahydrofuran) polyethers extended with methylene-bis-phenyl diisocyanate and hydrazine, and the like.

The polyesters for the urethane polymers of this invention include the reaction products of adipic acid or phthalic anhydride with any of ethylene glycol, propylene glycol, 1,3-butylene glycol, 1,4-butylene glycol, diethylene glycol, 1,2,6-hexane triol trimethylolpropane or 1,1,1-trimethylolethane.

The method for preparing the blends of the above-described normally hydrophilic polymeric material and polyurethane is the same as described hereinabove with respect to the polymers of vinyl chloride. For example, the normally hydrophilic and normally hydrophobic polymeric materials may be dissolved in a mutual solvent or they may be dry blended using the techniques described in detail hereinabove. Dry blending is a particularly preferred technique for preparing the blends.

As stated above, the polyurethane compositions are comprised of 25 to about 40 percent by weight of the normally hydrophilic polymeric material, and 75 to about 60 percent by weight of the normally hydrophobic polymeric material. However, polymeric blends comprising about 30–35 percent by weight of the normally linear hydrophilic polymeric material, and 70–65 percent by weight of the normally hydrophobic polyurethane are most preferred.

The following example illustrates the novel beneficial properties possessed by the polyurethane based polyblends of the invention.

EXAMPLE 15
Production Of A Vapor Permeable Film From A Poly(N,N-Dimethylacrylamide)/Poly(Butyl Acrylate) Copolymer-Polyurethane Polyblend Granular polyurethane rubber (Estane 5702*, a product of B. F. Goodrich Co.) and powdered poly(N,N-dimethylacrylamide)/butyl acrylate (90/10) were blended in a paper cup in varying amounts as set forth in the Table found below. The mixtures were worked on a two-roll rubber mill at a temperature in the range of from 290°–325°F for 5 minutes (at lower levels of the normally hydrophilic polymeric material, the temperature had to be lowered since the polyurethane was too soft). After this time, the fused mixture was milled for an additional period of from about 5–10 minutes to ensure a uniform plastic mass. This mass was then taken off the mill and was pressed at a temperature of about 300°F between two chromed steel plates separated by suitable spacing frames to provide thin sheets having a thickness of about 10 and 20 mils. The sheets were then cooled to room temperature to yield the desired product. The sheets of approximately 10 mils thickness were analyzed for water vapor transmission properties by the method described hereinabove. The water absorption and weight loss data were obtained from 20 mil-films utilizing the method described hereinabove. The data for the respective films is set forth in the following Table.

*Estane 5702 — a thermoplastic urethane elastomer prepared from 4,4'-diphenylenemethane diisocyanate, adipic acid and 1,4-butanediol

| Specific gravity | 1.20 |
|---|---|
| Shore hardness | |
| "A" scale | 70 |
| "D" scale | 23 |
| Stress-strain properties (ASTM D412) | |
| Tensile strength, psi | 5000 |
| 300% modulus, psi | 420 |
| Ultimate elongation % | 720 |
| Graves angle tear (ASTM D625), lbs/in | 250 |

Resistant to petroleum based fuels, oils and greases; swellable and degradable in hot water, concentrated acids and bases, polar solvents, a high concentration of aromatics and strong oxidizing acids.

TABLE

| Polyurethane (Parts by Weight) | Poly-(NNDMA) (Parts by Weight) | % Water Absorption | | | | % Weight Loss | | | WVT g/m$^2$24 hours |
|---|---|---|---|---|---|---|---|---|---|
| | | A[a] | B | C | D | A | C | D | |
| 60 | 40 | dec[b] | 12.7 | 107 | 205 | dec | na. | −3.0 | 470 |
| 70 | 30 | dec | 10.0 | 71 | 150 | dec | 0 | 0 | 300 |
| 80 | 20 | 72.4 | 6.4 | 5.6 | 38 | −3.6 | 0 | 0.1 | 60 |
| 90 | 10 | 14.9 | 4.0 | 3.2 | 10 | −0.4 | 0 | 0.1 | 60 |
| 100 | — | na.[c] | 1.0 | 1.0 | 1.0 | 0 | 0 | 0 | 50 |

[a]Condition A = Immersion in boiling water for 1 hour.
Condition B = Exposure to 85% relative humidity for 18 hours.
Condition C = Immersion in water at room temperature for 1 hour.
Condition D = Immersion in water at room temperature for 18 hours.
[b]Decomposed
[c]na. = not available As it can be seen from the data in the Table above, the blends having 20 parts by weight and less of the normally hydrophilic polymeric material are not suitable as breathable films for the reason that their water vapor transmission properties are far less than 150 g./24 hrs./m². Furthermore, if the normally hydrophilic polymeric material is present in amounts exceeding 40 parts by weight, the blend has a tendency to decompose when immersed in boiling water. Therefore, the composition parameters set forth hereinabove, unexpectedly provide a balance of being strong and durable, while at the same time being breathable. The films are, therefore, excellently suited for preparing breathable yet water impermeable coated fabrics from knit, woven and non-woven textile products.

The films of the present invention (either the polyurethane or the polymers of vinyl chloride based blends) may be bonded to woven or non-woven fabric by any suitable method known to those skilled in the art. For example, fabric comprising a polyester or cotton can be conveniently laminated by first placing a layer of the film of the present invention on top of the fabric, secondly, placing a suitable embossed release paper having a design on the film to provide a three layer assembly. The assembly is then subjected to very light pressure (too much pressure will cause the film to be entrained into the fabric and give an undesirable stiffness to the coated fabric) by the action of a preheated press (i.e., preheated to a temperature of about 300°F to cause a mere coating on the fabric or substrate. The coated fabric is thereafter cooled and the release paper is removed.

Alternatively, a substrate such as a woven or non-woven fabric can be coated with the film of the present invention by solvent deposition. Such a method can be accomplished by first dissolving the blend in a suitable mutual solvent and depositing the same on a suitable release paper. Secondly, the solvent is evaporated until the resulting film is barely tacky and the substrate (woven or non-woven fabric such as polyester or cotton) is placed on the tacky film. The solvent-free film assembly is thereafter lightly pressed together by the action of a preheated press (e.g., about 200°F), cooled and the release paper is removed to obtain the final finished product. A similar procedure is employed with respect to the modified plastisol technique wherein the alkanol (butanol) is first evaporated to provide a tacky film coated on the release paper, prior to the "curing" or heating step.

As is commonly the practice in the coated fabric art, the coated and/or laminated products of the present invention may be topcoated or undercoated with materials known for this purpose. For example, the above-described coated or laminated substrate may be coated with porous or non-porous polyurethanes, etc.

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:
1. A water vapor permeable polymeric composition comprising a substantially homogeneous blend of:
   a. a normally hydrophilic linear thermoplastic polymeric material comprising from about 25 to about 40 parts by weight of a homopolymer, copolymer or graft copolymer of an unsaturated amide of the formula:

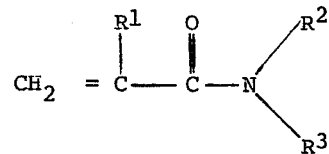

wherein $R^1$ is selected from the group consisting of hydrogen and alkyl of up to 4 carbon atoms; $R^2$ and $R^3$ are alkyl of up to 4 carbon atoms, said copolymer or graft copolymer being comprised of at least 75% by weight of said amide; and
   b. a normally hydrophobic polymeric material comprising from about 75 to about 60 parts by weight of a polyurethane, the combined weights of said normally hydrophilic and hydrophobic polymeric materials being 100 parts by weight,
said polymeric composition being capable of producing continuous films and foams having improved water vapor transmission properties.

2. The composition of claim 1, wherein said normally hydrophilic linear thermoplastic polymeric material is a copolymer of:
   a. N,N-dimethylacrylamide, and
   b. a monomer capable of producing a polymer having a glass transition temperature less than poly(N,N-dimethylacrylamide).

3. The composition of claim 2, wherein said normally hydrophilic linear thermoplastic polymeric material is a copolymer of:
   a. N,N-dimethylacrylamide, and
   b. a monomer selected from the group consisting of butyl acrylate, 2-ethylhexyl acrylate, acrylonitrile and vinyl acetate.

4. The composition of claim 2, wherein said normally hydrophilic linear thermoplastic polymeric material is a copolymer of N,N-dimethylacrylamide and butyl acrylate.

5. The composition of claim 2, wherein said copolymer is comprised of at least about 75% by weight of N,N-dimethylacrylamide.

6. The composition of claim 5, wherein said normally hydrophilic linear thermoplastic polymeric material is a copolymer of about 90% by weight N,N-dimethylacrylamide and about 10% by weight of butyl acrylate.

7. A water vapor permeable polymeric composition comprising a substantially homogeneous blend of:
   a. a normally hydrophilic linear thermoplastic polymeric material comprising from about 25 to about 40 percent by weight of a copolymer of:
      i. N,N-dimethylacrylamide, and
      ii. A monomer capable of producing a polymer having a glass transition temperature less than poly(N,N-dimethylacrylamide), said copolymer being comprised of at least 75% by weight of N,N-dimethylacrylamide; and b. a normally hydrophobic polymeric material comprising from about 60 to about 40 percent by weight polyurethane, said polymer composition being capable of producing continuous films and foams having improved water vapor transmission properties.

8. The composition of claim 7, wherein said normally hydrophilic linear thermoplastic polymer material is a copolymer of N,N-dimethylacrylamide and butyl acrylate.

9. The composition of claim 7, wherein said substantially homogeneous blend is comprised of from about 30 to 35 percent by weight of said normally linear hydrophilic polymeric material and from about 70 to about 65 percent by weight of said normally hydrophobic polyurethane.

10. An article coated with the composition of claim 1.

11. An article coated with the composition of claim 6.

12. An article coated with the composition of claim 7.

13. An article coated with the composition of claim 9.

* * * * *